US012697696B2

(12) United States Patent
Allen et al.

(10) Patent No.: US 12,697,696 B2
(45) Date of Patent: Aug. 4, 2026

(54) CONTROLLER FOR A DRILL

(71) Applicant: Bruce McRae Allen, Glen Forrest (AU)

(72) Inventors: Bruce McRae Allen, Glen Forrest (AU); Hans Kunz, Bayswater (AU); Thomas James Drummond Clarkson, Attadale (AU); Kathryn Beech, Spearwood (AU); James Filear, Stoneville (AU); Carlos Uribe, Woodlands (AU)

(73) Assignee: Bruce McRae Allen, Glen Forrest (AU)

( * ) Notice: Subject to any disclaimer, the term of this patent is extended or adjusted under 35 U.S.C. 154(b) by 202 days.

(21) Appl. No.: 18/037,572

(22) PCT Filed: Nov. 18, 2021

(86) PCT No.: PCT/AU2021/051380
§ 371 (c)(1),
(2) Date: May 18, 2023

(87) PCT Pub. No.: WO2022/104429
PCT Pub. Date: May 27, 2022

(65) Prior Publication Data
US 2024/0001502 A1 Jan. 4, 2024

(30) Foreign Application Priority Data

Nov. 18, 2020 (AU) ................................ 2020904248
Aug. 25, 2021 (AU) ................................ 2021902746

(51) Int. Cl.
B23Q 15/08 (2006.01)
B23B 35/00 (2006.01)
(Continued)

(52) U.S. Cl.
CPC .............. B23Q 15/08 (2013.01); B23B 35/00 (2013.01); B23B 45/02 (2013.01); B23Q 15/12 (2013.01);
(Continued)

(58) Field of Classification Search
CPC ........ B23Q 15/08; B23Q 15/12; B23B 35/00; B23B 45/02; B23B 2270/32; B23B 2270/03
(Continued)

(56) References Cited

U.S. PATENT DOCUMENTS

| | | | |
|---|---|---|---|
| 5,038,084 A | * | 8/1991 | Wing ...................... H02P 25/14 |
| | | | 388/811 |
| 5,558,476 A | | 9/1996 | Uchida et al. |

(Continued)

FOREIGN PATENT DOCUMENTS

| | | |
|---|---|---|
| JP | 11-156601 | 6/1999 |
| JP | 2005-144580 | 6/2005 |
| JP | 2017-087412 | 5/2017 |

OTHER PUBLICATIONS

Lobras et al. (CN 103481251 B). Power Tool Having Multiple Modes Of Operation (Year: 2017).*
(Continued)

*Primary Examiner* — Jorge L Carrasquillo

(57) ABSTRACT

A controller for controlling a motor of a drill comprising an output of a signal for controlling a speed of rotation of the motor, a processor for producing the signal, wherein the signal is automatically varied according to a waveform, wherein one or more characteristics of the waveform is determined by a material to be drilled and a diameter of the bit.

15 Claims, 4 Drawing Sheets

(51) Int. Cl.
*B23B 45/02* (2006.01)
*B23Q 15/12* (2006.01)

(52) U.S. Cl.
CPC ....... *B23B 2270/32* (2013.01); *B23B 2270/36*
(2013.01)

(58) Field of Classification Search
USPC ........................................................ 318/268
See application file for complete search history.

(56) References Cited

U.S. PATENT DOCUMENTS

| | | | |
|---|---|---|---|
| 6,424,799 B1 | 7/2002 | Gilmore | |
| 2005/0039951 A1* | 2/2005 | Sato ........................ | B28D 1/041 |
| | | | 175/57 |
| 2008/0260485 A1 | 10/2008 | Jaillon et al. | |
| 2014/0047959 A1* | 2/2014 | Mann ...................... | B23B 47/34 |
| | | | 82/1.11 |
| 2019/0314946 A1* | 10/2019 | Dey, IV ................. | B23G 1/225 |

OTHER PUBLICATIONS

International Preliminary Report on Patentability Dated Feb. 23, 2023 From the International Preliminary Examining Authority Re. Application No. PCT/AU2021/051380. (50 Pages).

International Search Report and the Written Opinion Dated Feb. 14, 2022 From the International Searching Authority Re. Application No. PCT/AU2021/051380. (9 Pages).

International-Type Search for Provisional Patent Application Dated Nov. 12, 2021 From the Australian Government, IP Australia Re. Application No. 2021902746. (13 Pages).

\* cited by examiner

CONTROLLER FOR A DRILL

RELATED APPLICATIONS

This application is a National Phase of PCT Patent Application No. PCT/AU2021/051380 having International filing date of Nov. 18, 2021, which claims the benefit of priority of Australia Patent Application Nos. 2020904248 filed on Nov. 18, 2020 and 2021902746 filed on Aug. 25, 2021. The contents of the above applications are all incorporated by reference as if fully set forth herein in their entirety.

FIELD AND BACKGROUND OF THE INVENTION

The present invention relates to a controller and a method for controlling a drill.

The following discussion of the background art is intended to facilitate an understanding of the present invention only. It should be appreciated that the discussion is not an acknowledgement or admission that any of the material referred to was part of the common general knowledge as at the priority date of the application.

The efficiency of drilling a hole in a workpiece is dependent on a number of factors including, but not limited to, the material which the work piece is made from, the size of the drill bit, the type of drill being used, the force applied to the drill and the angle at which the drill is oriented relative to the workpiece.

The speed at which the drill bit rotates can affect the rate of penetration into a workpiece. In some instances where the speed is too slow, the drill bit may stall. In other instances where the speed in too fast, the cutting edge of the drill bit may not have an adequate opportunity to engage with the workpiece and instead will rotate above the workpiece within the hole.

It is known that different materials have different optimal drill speeds. A computer-controlled drill can be configured to drill precisely at a respective optimal drilling speed for the material being drilled. A handheld drill will operate based on an input to (squeeze of) a trigger by a user. It is not practical for a user to know a quantitative speed of a drill beyond a relatively qualitative value, such as full speed, fast, half speed, medium, low speed or slow. Accordingly, a user of a handheld drill will only be able to approximate an optimal drill speed for a given material being drilled.

Throughout the specification unless the context requires otherwise, the word "comprise" or variations such as "comprises" or "comprising", will be understood to imply the inclusion of a stated integer or group of integers but not the exclusion of any other integer or group of integers.

Throughout the specification unless the context requires otherwise, the word "include" or variations such as "includes" or "including", will be understood to imply the inclusion of a stated integer or group of integers but not the exclusion of any other integer or group of integers.

SUMMARY OF THE INVENTION

According to a first aspect of the present invention, there is provided a drill comprising:

a controller configured to automatically vary a speed of rotation of a bit according to a waveform, the waveform having a characteristic selected according to a material being drilled and a diameter of the bit.

In an embodiment, the controller provides an electric current output to a motor engageable with the bit for rotating the bit, wherein the electric current output controls the speed of rotation of the bit by varying an output speed of the motor.

In an embodiment, the controller directly controls the speed of rotation of the motor.

In an embodiment, the waveform is independent of axial movement of the bit and/or force of the bit on the material being drilled.

In an embodiment, the electric current output varies so as to vary the output speed according to the waveform, where an amplitude of the waveform reflects the speed of rotation and a frequency of the waveform reflects the rate of variation of the speed.

In an embodiment, the characteristic is one or both of the difference between maximum and minimum amplitude of the waveform and the frequency of the waveform.

In an embodiment, the controller comprises an input for selection of the material being drilled. Alternatively, the controller comprises an input for receiving the amplitude and/or the frequency of a period of the waveform.

In an embodiment, the range of amplitude of the waveform is selected according to a diameter of the bit.

In an embodiment, the controller comprises an input for selection of a range of amplitudes of the waveform. Alternatively, or in combination, the controller comprises an input for an offset of the waveform. Alternatively, or in combination, the controller comprises an input for the diameter of the bit.

In an embodiment, the input comprises a selector for one of or each of the amplitude and the frequency.

In an embodiment, the controller comprises an input for selection of the type of drill bit.

In an embodiment, the speed of rotation of the bit is varied by controlling a voltage supplied to a motor of the drill according to an amplitude of the waveform.

In an embodiment, the controller is configured to apply torque to the bit during a part of the waveform having a negative gradient.

In an embodiment, the frequency of the waveform is selected for one of at least drilling of steel, wood, hard rock and/or masonry. In an embodiment, the frequency of the waveform is selected for screwing of a self-tapping screw.

In an embodiment, the frequency for the material being drilled is selected so as to provide the bit with the opportunity to cut the material across the radius of a cutting edge of the bit in an efficient manner.

In an embodiment, the frequency is selectable for the material being drilled such that the bit rotates at a speed substantially optimised for a radial point on the cutting edge for long enough to cut the material at that radius before the speed changes to be substantially optimised for a different radial position on the cutting edge.

In an embodiment, the controller comprises and input for receiving the material and/or the diameter of the bit.

In an embodiment, wherein the received material and/or the diameter of the bit is processed by the controller to determine one or more of the characteristics of the waveform.

In an embodiment, the voltage is varied during operation of the drill between a maximum voltage and a minimum voltage.

In an embodiment, the maximum voltage is limited by capacity of the drill.

In an embodiment, the minimum voltage is zero volts. In alternative embodiments, the minimum voltage is greater than zero.

In an embodiment, the waveform is substantially a sinusoidal waveform.

Alternatively, the waveform is a sawtooth waveform. Alternatively, the waveform is a triangular waveform.

In an embodiment, a maximum power is delivered to the bit at a peak of the waveform.

In an embodiment, a minimum power is delivered to the bit at a trough of the waveform.

In an embodiment, the drill is a handheld drill.

In an embodiment, the controller is configured to drive the drill bit at least at two points within each period of the waveform.

According to a second aspect of the present invention, there is provided a controller for controlling a motor of a drill comprising:

an output of a signal for controlling a speed of rotation of the motor, a processor for producing the signal, wherein the signal is automatically varied according to a waveform, wherein one or more characteristics of the waveform is determined by a material to be drilled and/or a diameter of the bit.

In an embodiment, the one or more characteristics of the waveform comprises amplitude, frequency, and offset.

In an embodiment, the processor is configured to determine the frequency according to the material.

In an embodiment, the processor is configured to determine the amplitude according to the diameter of the bit.

In an embodiment, the processor is configured to determine the frequency and/or the amplitude according to the material.

In an embodiment, the processor is configured to determine the frequency and/or the amplitude according to the diameter of the bit.

According to a third aspect of the present invention, there is provided a computer program for controlling the speed of rotation of a motor of a drill, the computer program comprising:

instructions for execution by a processor which cause the motor of the drill to be controlled such that a speed of rotation of the motor is automatically varied according to a waveform, wherein one or more characteristics of the waveform is determined by a material to be drilled and a diameter of the bit.

In an embodiment, the frequency is determined by selection of the material to be drilled.

In an embodiment, the amplitude is determined by selection of the diameter of the bit.

In an embodiment, a frequency and/or an amplitude of the waveform is determined by selection of the material to be drilled.

In an embodiment, the frequency and/or the amplitude of the waveform is determined by selection of the diameter of the bit.

In an embodiment, the computer program comprising computer executable instructions stored in a non-transient manner for controlling a processor of a drill to perform one or more of the methods defined below.

According to a fourth aspect of the present invention, there is provided a method of controlling the speed of rotation of a drill comprising:

providing a signal to control the speed of rotation of a motor of the drill, the output signal comprising an electric current automatically varied according to a waveform;

wherein one or more characteristics of the waveform is determined by at least one of the material to be drilled and a diameter of the bit.

In an embodiment, the frequency is determined according to the material to be drilled.

In an embodiment, the amplitude is determined according to the diameter of the bit.

In an embodiment, a frequency and/or an amplitude of the waveform is determined according to the material to be drilled.

In an embodiment, the frequency and/or the amplitude of the waveform is determined according to the diameter of the bit.

According to a fifth aspect of the present invention, there is provided a method of drilling comprising:

controlling a speed of rotation of a bit by the drill as it is drilled into a workpiece, wherein the speed is controlled by automatically varying the rotation of the bit according to a material from which the workpiece is formed and according to a diameter of the bit.

In an embodiment, a frequency of the speed of rotation of the bit is automatically varied according to the material to be drilled.

In an embodiment, an amplitude of the speed of rotation of the bit is automatically varied according to the diameter of the bit.

According to a sixth aspect of the present invention, there is provided a drill comprising:

a controller configured to automatically vary a speed of rotation of a bit according to a waveform having a frequency selected according to a material being drilled.

In an embodiment, the drill is a handheld drill.

According to a seventh aspect of the present invention, there is provided a drill comprising:

a controller configured to automatically vary a speed of rotation of a bit according to a waveform having an amplitude selected according to a diameter of a bit.

In an embodiment, the drill is a handheld drill.

According to an eighth aspect of the present invention, there is provided a drill comprising:

a controller configured to automatically vary a speed of rotation of a bit according to a waveform, the waveform having a characteristic selected according to a material being drilled.

According to a ninth aspect of the present invention, there is provided a drill comprising:

a controller configured to automatically vary a speed of rotation of a bit according to a waveform, the waveform having a characteristic selected according to a diameter of the bit.

According to a tenth aspect of the present invention, there is provided a drill comprising:

a controller configured to automatically vary a speed of rotation of a bit according to a waveform, the waveform having a characteristic selected according to a material being drilled and a diameter of the bit.

BRIEF DESCRIPTION OF THE SEVERAL VIEWS OF THE DRAWINGS

In order to provide a better understanding, embodiments of the present invention will be described, by way of example only, with reference to the accompanying drawings, in which.

5

6

Figure 1:
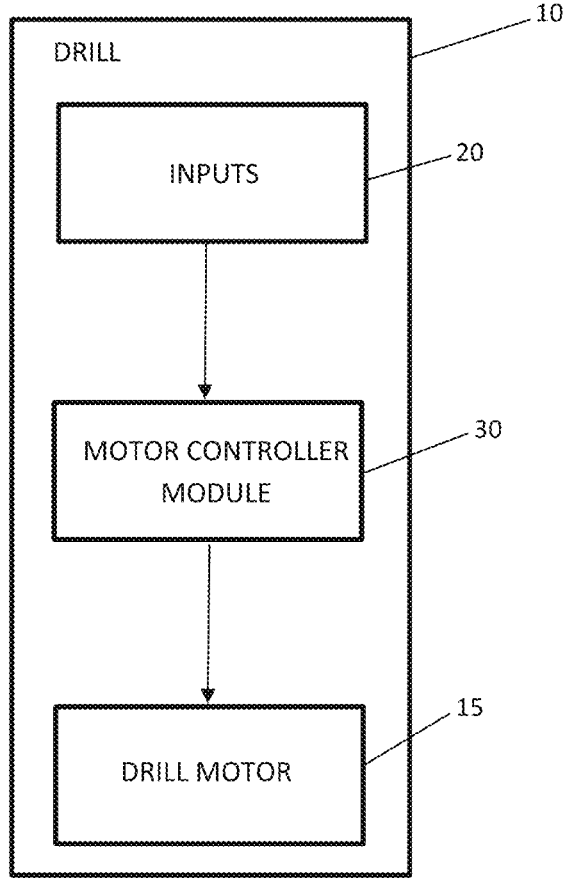
FIG. 1 is a block diagram of the components of an embodiment of the present invention.
Figure 2:
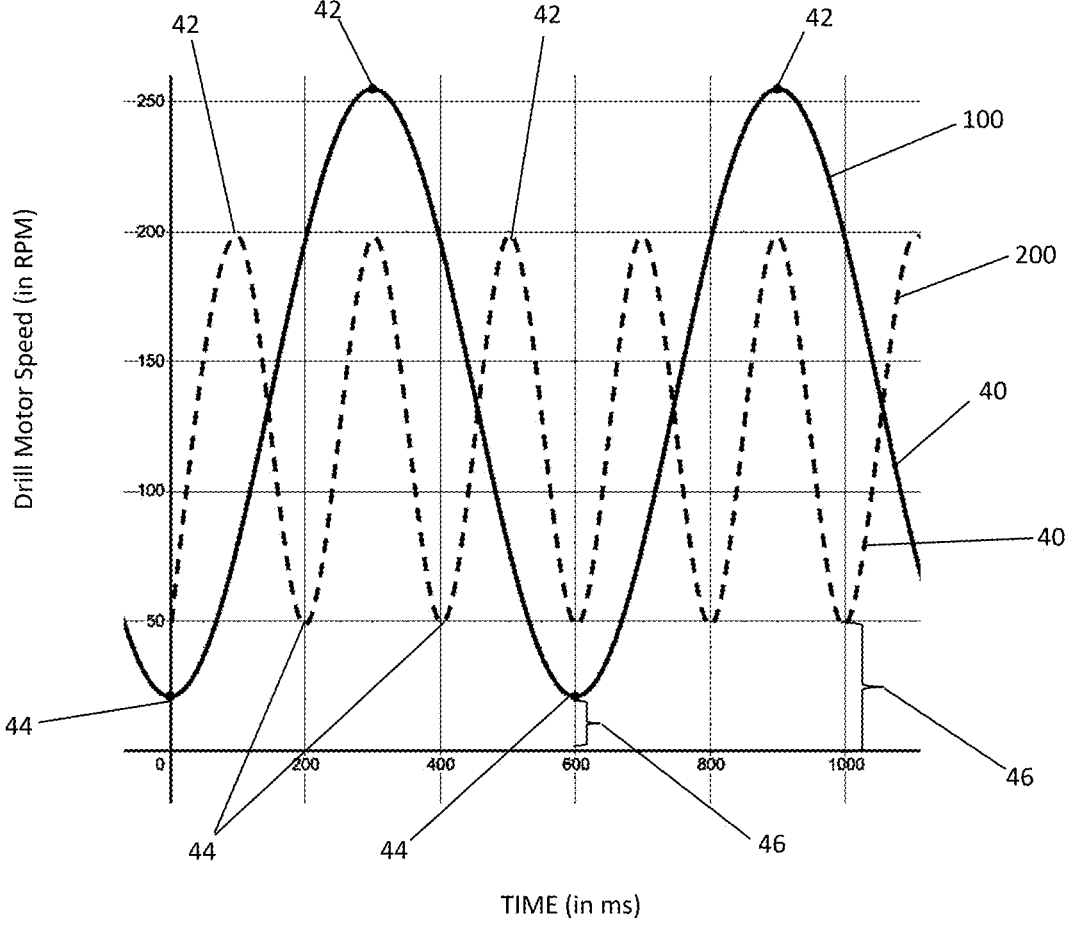
Figure 3:
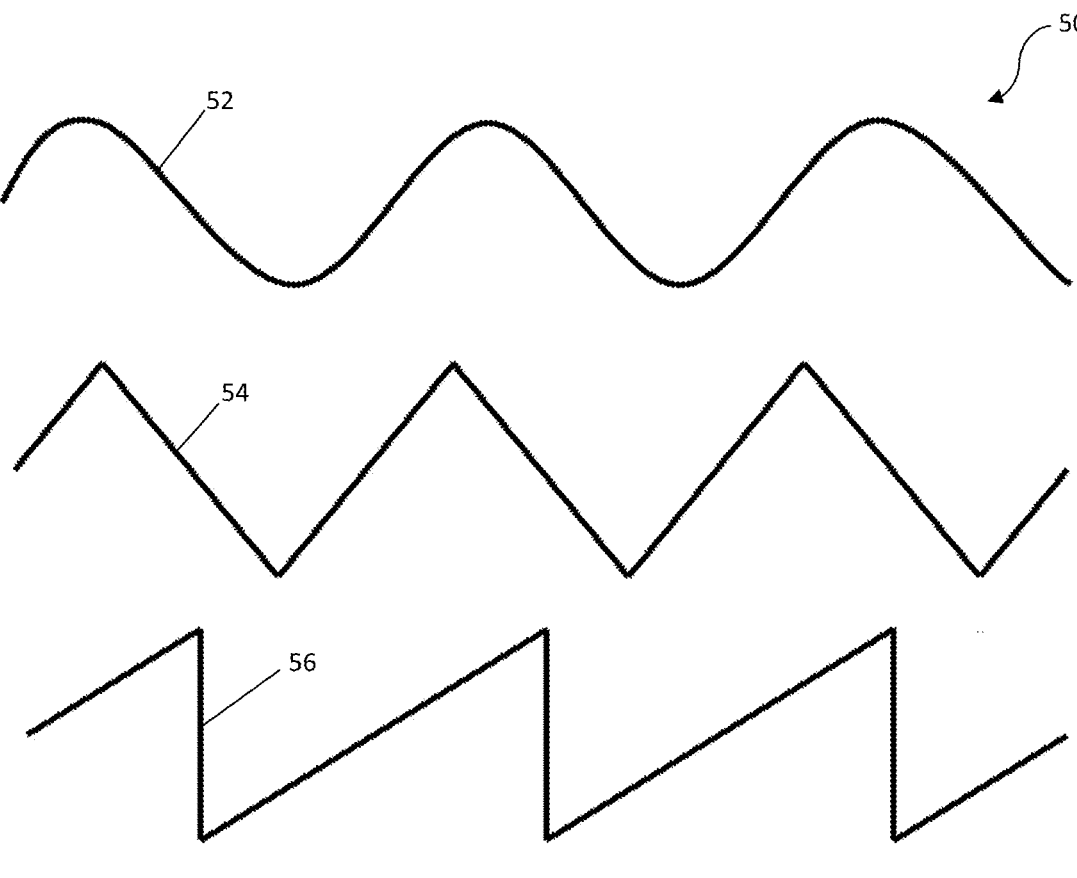
Figure 4:
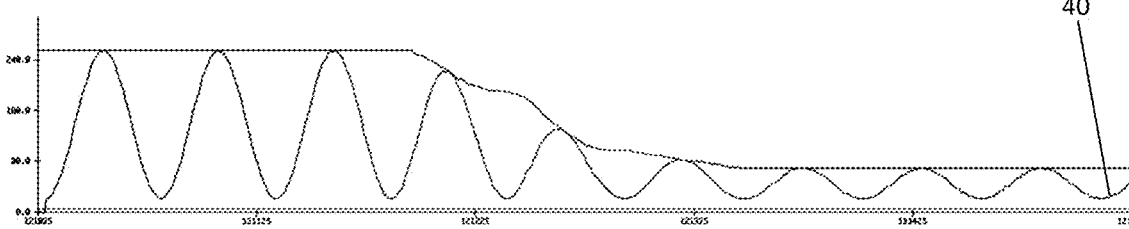
Figure 5:
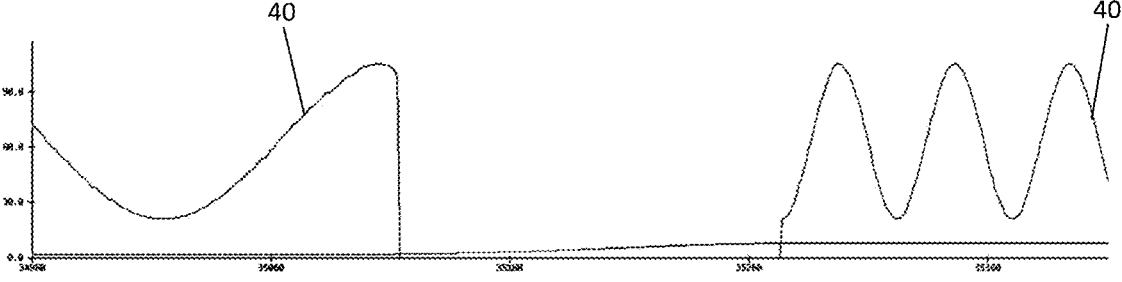
Figure 6:
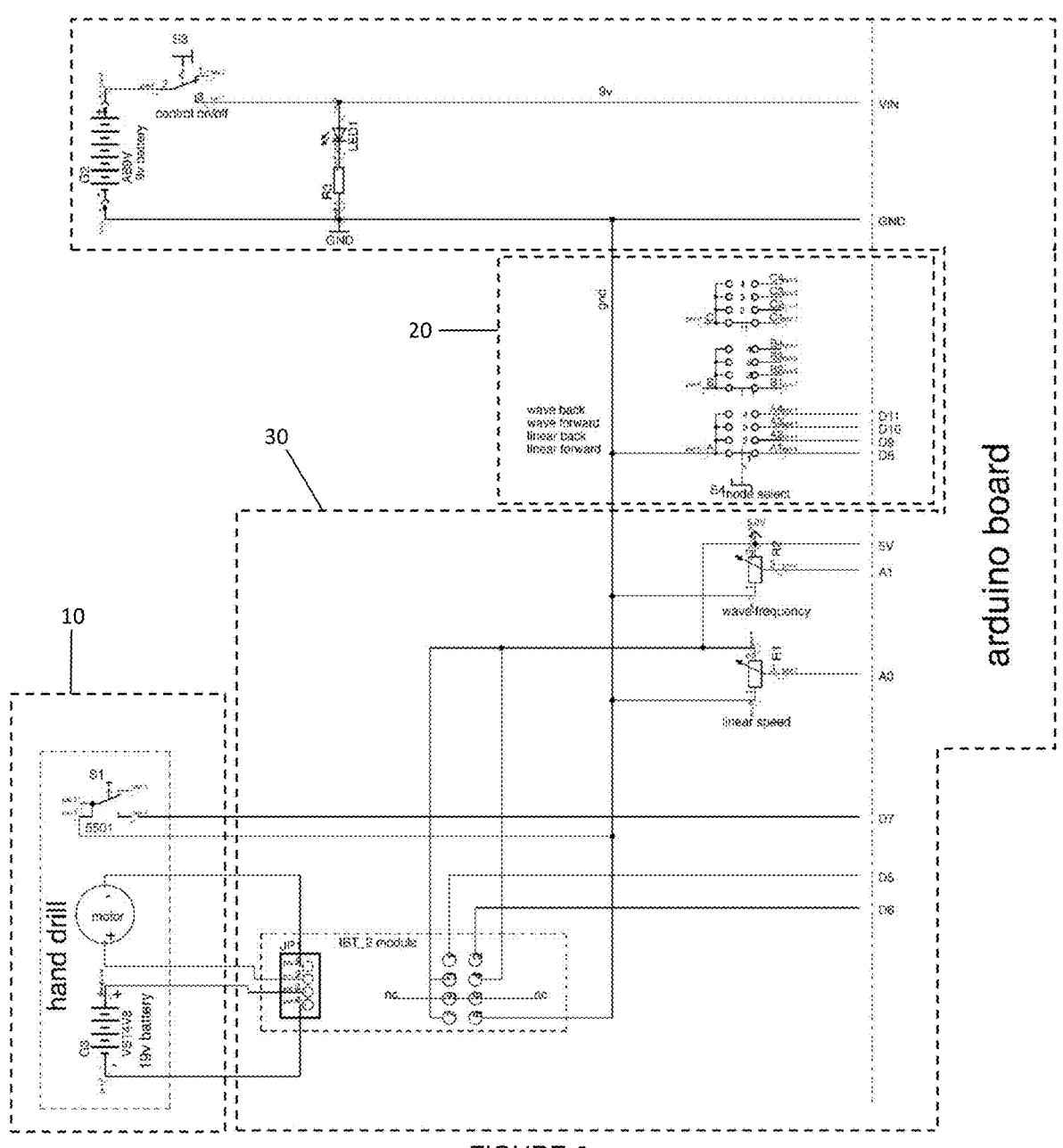

FIG. 2 is two alternative speed curves of a drill motor which are offset and vary according to waveforms according to embodiments of the present invention;

FIG. 3 is a side-by-side view of different waveforms which the drill motor speed may be varied according to according to an embodiment of the present invention;

FIG. 4 is a plot of the change of amplitude of the speed curve according to an embodiment of the present invention;

FIG. 5 is a plot of the change of frequency of the speed curve according to an embodiment of the present invention; and FIG. 6 is a circuit diagram of an example of the motor controller module of FIG. 1.

DESCRIPTION OF SPECIFIC EMBODIMENTS OF THE INVENTION

Referring to FIG. 1, there is provided a block diagram of the components of the present invention. There is provided a drill 10 comprising a control panel. The control panel comprises one or more inputs 20 for controlling a drill so as to automatically vary a speed of a drill motor 15, and by extension a bit engaged by the drill 10. A motor controller module 30 receives the inputs and controls the drill 10 according to the one or more inputs 20 selected on the control panel. The inputs 20 chosen to vary the speed of the drill motor 15 according to a waveform 50 (such as, as can be seen in FIGS. 2 and 3) having a characteristic which selected according to the material which the workpiece is made and/or a diameter of a drill bit engaged by the drill 10. Reference to drilling speed typically means the 'revolutions per minute' of the drill motor 15 and therefore, the drill bit. Preferably, the speed of the drill motor 15 is varied continuously so as to prevent stalling of the drill bit.

The motor controller module 30 may comprise a processor, a storage device, a motor speed controller and a power supply. In the present embodiment, the motor controller module 30 is embodied using a microcontroller, such as an Arduino® microcontroller, and a motor speed controller. The person skilled in the art would appreciate that there are a number of alternative components and ways in which the present invention may be implemented. It is only by way of an example which the preferred embodiment is provided. The storage device may be access, updated and configured by way of known techniques.

The inputs 20 also comprises an input for selection of a mode of operation. The modes of operation may comprise forward, reverse, wave forward, and optionally wave reverse. Accordingly, the drill 10 may be used as a normal drill, in forward or reverse, or by varying the speed of the drill motor 15 according to a waveform 50, in forward or optionally in reverse.

The inputs 20 may include a manual selector, but are not limited to, one or more of the following buttons, switches, knobs, slider, other form of selector, etc. The inputs 20 may comprise discrete selections or analogue selections. For example, the inputs 20 may comprise a switch having a discrete selection for masonry, which when selected, the drill 10 is configured to vary the speed of rotation of the motor according to the waveform 50. The inputs 20 may also include a selection allowing the drill to operate at a constant speed of rotation, as the drill would operate normally without the motor controller module 30.

It is known that there are recommended drilling speeds based on at least the material being drilled as well as the outer diameter of the drill bit, also referred to as the size of the drill bit. These recommended drilling speeds consider only the outer diameter of the drill bit. However, the drill bit must first drill from a point of the drill bit which has a diameter which is smaller than the outer diameter of the drill bit which the recommended drilling speed is determined. For example, a 10-millimetre (mm) drill bit may come to a point. Accordingly, the drilling of a hole begins at a smaller diameter than that of the outer diameter of the drill bit. Furthermore, as the drill bit continues to cut the diameter of the cutting tip in contact and cutting the workpiece progressively increases. Among other things, the recommended drilling speeds are intended to produce an optimal drilling response. Generally speaking, as the diameter of the drill bit increases, the recommended speed decreases. Therefore, the present invention seeks to automatically vary the speed of the motor of the drill 10 through the motor controller module 30 so as to account for the change in diameter of the drill bit as it drills through a material.

The control panel may comprise inputs 20 which allow a user to select the type of material being drilled. The motor controller module 30 may then alter the operational characteristics of the drill 10 in accordance with the inputs 10. Alternatively, where the material is unknown or the drill bit size is not available, the controller comprises an input 20 which allows the user to adjust a frequency of a period of the waveform 50. Accordingly, the user may increase the speed at which the motor controller module 30 automatically varies the speed of the drill motor 15.

Alternatively, the control panel may comprise inputs 20 to select the diameter of the bit to automatically vary the range of an amplitude of the waveform 50. Accordingly, the input 20 may allow the user to adjust a maximum drill motor 15 speed. As such, the drill motor 15 would still be driven according to the waveform 50, however, the peak amplitude of the speed of the drill may be increased. The inputs 20 may also allow for the waveform 50 which the drill motor 15 is being driven according to is offset. As such, when the trigger is actuated on the drill, the speed of the drill may start and conform to the waveform 50. However, it will not be varied to reach the original starting speed until the trigger is released.

There are many types of drill bits which are specially designed for a particular material. Accordingly, the drill bit may include, but is not limited to, a masonry drill bit, a metal drill bit or a wood drill bit. The control panel may comprise an input 30 allowing the user to select the type of drill bit being used with the drill 10. This may alter the range, the maximum and/or the minimum speeds of the drill of the waveform 50.

The present invention is preferably installed in or in connection with a handheld drill. The person skilled in the art would appreciate that the present invention may implemented in other types of drills such as, but not limited to, a stationary drill press or a computer numerical control (CNC) drilling machine. The motor control module 30 may be connected to the drill intermediate a power source. For example, the motor control module 30 may connect to a hand drill through a battery connector. Following connection of the motor control module 30 to the hand drill, the battery may connect to the motor control module 30.

Referring to FIG. 2, there is provided two alternative speed curves of the drill motor 15 according to waveforms 50. The two alternative speed curves exemplify the differences each speed curve may comprise between a first material 100 and a second material 200. As can be seen, the first material 100 has a larger amplitude but a lower frequency when compared to the second material 200.

In the present embodiment, the preferred waveform 50 is a sinusoidal waveform 52 (as seen in FIG. 3). The sinusoidal waveform 52 was chosen for the smooth operation of the drill motor 15 it provides. However, the present invention works with a sawtooth waveform 56 or triangular waveform 54 (as seen in FIG. 3). The present invention may work with any periodic waveform 50 such as a square wave, however, the waveform 50 mentioned above have provided the most optimal performance. The speed of rotation of the bit is varied by controlling a voltage or current supplied to a motor of the drill 10 according to an amplitude of the waveform 50. In the present embodiment, the motor controller within the motor controller module requires a pulse width modulated input. Accordingly, the microcontroller outputs the waveform 50 using a pulse width modulated signal to the motor speed controller within the motor controller module 30. The motor speed controller within the motor controller module 30 converts said output into a signal comprising a voltage or current which varies according to the waveform 50 to the drill motor 15. The person skilled in the art would readily understand that the voltage applied as an input to the motor will induce a current, which in turn produces a magnetic field in the motor coil(s) that causes a rotor of the motor to rotate. Thus, the voltage applied can control the speed of the motor. Whether by a voltage source which in turn creates the current provided to the motor's coil(s), or by direct control of the current from a current source, the amount of current provided to the motor controls the speed of the motor 15, subject to loading on the motor 15. Thus, the present invention may be implemented by controlling the voltage or the current because control of the voltage is indirectly control of the current provided to the motor.

As seen in FIG. 2, the minimum speeds of the first material 100 and the second material 200 occurs at a respective trough amplitude 44 of the speed curves 40 which are respectively offset 46 from zero. Accordingly, subject to the inputs, once the trigger of the drill 10 is actuated, the drill will slowly begin to increase which may conform to one of the speed curves 40 shown in FIG. 2. As the speed of the drill is automatically varied it will range from a respective peak amplitude 42 to a minimum amplitude at the respective trough amplitude 44 continuously until the trigger is released. Again, provided the drill 10 is able to drive at the drilling recommended drilling speeds for the material and drill bit, then the drill 10 will be driven at least at two points in each period at an optimal drilling speed for the diameter of the drill which is at that time engaging with the workpiece.

Generally speaking, the optimal or recommended rotations per minute of the drill bit is a function of the desired feed rate and the diameter of the drill bit. For example, as a rule of thumb the formula is as follows:

$$\text{Revolutions Per Minute} = \frac{1000 \times \text{Cutting Speed}}{\pi \times \text{Diameter of Drill Bit}}$$

Cutting Speed is provided in meters per minute
Diameter of Drill Bit is provided in millimetres The above equation does not account for the differences between materials. Accordingly, if drilling through masonry there may be a coefficient applied to the right hand side of the equation to optimise the revolutions per minute for a particular material of a workpiece being drilled. As mentioned above, the inputs 20 may adjust the revolutions per minute by applying a coefficient to the calculation above so as to account for the differences in material. Therefore, when the input 20 is positioned to drill a material, for example wood, the optimal revolutions per minute may vary from the above equation according to a characteristic of the material.

During normal drilling operations, when the trigger of the drill 10 is released, the drill 10 may continue due to its momentum and be slowed down by friction of the drill motor 15 and/or the drill bit in a workpiece. The present invention drives the drill motor 15 applying a torque to the bit even during the varying of the speed of the drill motor 15 according to the waveform 50 having a negative gradient. The negative gradient occurs as the speed of the drill motor 15 begins to slow down from the peak amplitude 42 to the trough amplitude 44 of the waveform 50. Therefore, provided the drill 10 is capable of driving the drill bit within the recommended range of drilling speed, the drill bit should be driven at least at two points within each period such that the drilling speed will be optimal for the diameter which is in the process of drilling.

By automatically varying the frequency of the speed of the drill according to the waveform 50, the present invention has proven effective in the drilling of at least steel, wood, hard rock and/or masonry and for screwing of self-tapping screws. As mentioned above, the varying of the frequency according to the material being drilled provides the drill bit to cut the material across the radius of a cutting edge of the drill bit in an efficient manner. Efficient manner means the drill bit was cutting at an optimal drilling speed when engaged with the workpiece at the drill bit diameter which the optimal drilling speed applies. The frequency is selected based on the opportunity that it provides for the material being drilled and the size of the drill bit.

The frequency for the material being drilled is selected such that the bit rotates at a speed substantially optimised for a radial point on the cutting edge for long enough to cut the material at that radius before the speed changes to be substantially optimised for a different radial position on the cutting edge as the hole is drilled in the workpiece. Depending on the type of material if the rate of change of speed is too slow (frequency too low) the optimal speed for part of the cutting the bit is at may not be reaches quickly enough thus reducing the efficiency of the drilling. Also, depending on the type of material if the rate of change of speed is too fast (frequency too high) the optimal speed for part of the cutting the bit is at may be reached and passed by too quickly not allowing it to be at the optimal speed for long enough, thus reducing the efficiency of the drilling. Thus, there will be an optimal rate of change of speed (frequency of the waveform 50) at which the optimal speed will be reached quickly and also not passed by too quickly for each type of material for a given size of drill bit.

In order to vary the speed of the drill 10, the voltage or current supplied to the drill motor 15 is varied during operation of the drill 10 between a maximum voltage or current and a minimum voltage or current. The maximum voltage or current will be limited by a capacity of the drill 10. As discussed above, the minimum voltage or current may be zero. However, in some circumstances, to prevent stalling of the drill bit, the minimum voltage or current is offset from zero. Preferably, the voltage or current is offset from zero such that the when the speed of the drill is varied to the minimum voltage or current, the drill bit is still rotating.

The present invention is configured to provide the maximum power to the drill motor 15 when varying the speed of the drill motor 15 according to the peaks of the waveform 50. Conversely, the present invention is configured to provide the minimum power when varying the speed of the drill motor 15 to the troughs of the waveform.

In the present embodiment, there is provided a controller in the form of the motor controller module 30 which comprises the microcontroller and a motor speed controller. The microcontroller comprises a processor which produces the signal according to the inputs 20 provided at the control panel. The signal automatically varies according to a waveform 50, which is preferably a sinusoidal waveform 52. In the present embodiment, the microcontroller outputs a signal using pulse width modulation which the motor speed controller receives as an input and decodes as a signal to be output. The signal being output by the microcontroller using pulse width modulation is varied according to the waveform 50. The motor speed controller of the motor controller module 30 outputs the signal for controlling a speed of rotation of the drill motor 15. The signal comprises at least a voltage or current. The voltage or current is varied according to the waveform 50. The voltage or current drives the drill motor 15 which in turn drives the bit. The characteristics of the waveform 50 are determined by the material by at least the material to be drilled and/or the diameter of the drill bit. The characteristics of the waveform 50 can be varied so as to account at least for imperfections in the material to be drilled and uncertainty in the material being drilled.

The inputs available for the user to select to vary the waveform 50 which the drill motor 15 is automatically varied according to comprise one or more of amplitude, frequency and/or offset. For example, referring to FIGS. 5 and 6 there is provided different speed curves 40 of the drill motor 15. The speed curve 40 of FIG. 4 shows the amplitude of the speed of the drill motor 15 being varied during operation of the drill 10. The speed curve 40 of FIG. 5 shows the frequency of the speed of the drill motor 15 being varied during operation of the drill 10. In FIG. 5, there is provided a time wherein the motor speed drops to zero. This occurs when the trigger of the drill 10 has been released, when the trigger of the drill 10 is actuated again the drill ramps up quickly to start from the lowest speed according to the waveform 50, whether zero or offset from zero, and after reaching that speed build up and conform to the waveform 50 until the trigger of the drill 50 is released.

The motor controller module 30 stores a computer program for controlling the speed of rotation of a motor of the drill 10. The computer program comprises instructions for execution by a processor which causes the motor of the drill 10 to be controlled such that a speed of rotation of the motor is automatically varied according to a waveform 50, wherein one of more characteristics of the waveform 50 is determined by a material to be drilled and/or a diameter of the bit.

In an embodiment, the computer program comprising computer executable instructions stored in a non-transient manner for controlling a processor of a drill to perform one or more of the methods defined below.

Referring to FIG. 6 there is provided a circuit diagram of an embodiment of the invention comprising the drill 10, the inputs 20 and the motor controller module 30. The circuit diagram provided is intended to be one of many ways of implementing the invention and should not be construed as limiting on the invention. Additional components and/or features may be implemented where the person skilled the art would be inclined to do so.

The present invention can produce increased drilling efficiency. For example, less pressure may be required by a user of the drill 10 due to speed of the rotation of the motor of the drill 10 being handled by the motor controller module

30. Accordingly, a less strong user of the drill 10 having the motor controller module 30 may be capable of drilling a hole or screwing a screw into a material where they may otherwise not be capable of doing so, or less effort may be required, without the motor controller module 30. Through experimentation the inventor has found the present invention requires up to 40% less pressure to drill a hole when compared to drilling without the motor controller module 30.

Modifications may be made to the present invention within the context of that described and shown in the drawings. Such modifications are intended to form part of the invention described in this specification.

The invention claimed is:

1. A drill comprising:

a controller configured to automatically vary a speed of rotation of a bit according to a waveform, the waveform having a characteristic selected according to a material being drilled and a diameter of the bit;

wherein the controller comprises an input for receiving the material and the diameter of the bit, and wherein the received material and the diameter of the bit is processed by the controller to determine one or more of the characteristics of the waveform, wherein the controller provides an electric current output to a motor engageable with the bit for rotating the bit, wherein the electric current output controls the speed of rotation of the bit by varying an output speed of the motor, wherein the controller provides the electric current output or a voltage output to the motor, and wherein the minimum current or voltage is offset from zero so that, when the speed of the drill is varied according to the minimum current, the drill bit is still rotating.

2. The drill according to claim 1, wherein the controller directly controls the speed of rotation of the motor.

3. The drill according to claim 1, wherein the waveform is independent of axial movement of the bit and/or force of the bit on the material being drilled.

4. The drill according to claim 1, wherein the electric current output varies so as to vary the output speed according to the waveform, where an amplitude of the waveform reflects the speed of rotation and a frequency of the waveform reflects the rate of variation of the speed.

5. The drill according to claim 4, wherein the frequency of the waveform is selected for one of at least drilling of steel, wood, hard rock and/or masonry.

6. The drill according to claim 4, wherein the characteristic is one or both of the difference between maximum and minimum amplitude of the waveform and the frequency of the waveform.

7. The drill according to claim 6, wherein the controller comprises an input for receiving the amplitude and/or the frequency of the waveform.

8. The drill according to claim 7, wherein the input comprises a selector for one of or each of the amplitude and the frequency.

9. The drill according to claim 1, wherein the controller is configured to apply torque to the bit during a part of the waveform having a negative gradient.

10. The drill according to claim 1, wherein the waveform is substantially a sinusoidal, sawtooth or a triangular waveform.

11. The drill according to claim 1, wherein the drill is a handheld drill.

12. The drill according claim 1, wherein the controller is configured to calculate the waveform.

13. The drill according to claim 1, wherein the controller is configured to store a plurality of waveforms and select one of the stored waveforms to automatically vary a speed of rotation.

14. The drill according to claim 1, wherein the controller is configured to provide maximum power to the motor when varying the speed of the drill motor according to peaks of the waveform, and wherein the controller is configured to provide minimum power to the motor when varying the speed of the drill motor according to troughs of the waveform.

15. A drill comprising:

a controller configured to automatically vary a speed of rotation of a bit according to a waveform, the waveform having a characteristic selected according to a material being drilled and a diameter of the bit;

wherein the controller comprises an input for receiving the material and the diameter of the bit, and wherein the received material and the diameter of the bit is processed by the controller to determine one or more of the characteristics of the waveform, wherein the electric current output varies so as to vary the output speed according to the waveform, where an amplitude of the waveform reflects the speed of rotation and a frequency of the waveform reflects the rate of variation of the speed, and wherein the frequency is selectable for the material being drilled such that the bit rotates at a speed substantially optimized for a radial point on the cutting edge for long enough to cut the material at that radius before the speed changes to be substantially optimized for a different radial position on the cutting edge.

* * * * *